United States Patent [19]

En

[11] 4,055,832
[45] Oct. 25, 1977

[54] ONE-ERROR CORRECTION CONVOLUTIONAL CODING SYSTEM

[75] Inventor: John En, Palatine, Ill.

[73] Assignee: Motorola, Inc., Schaumburg, Ill.

[21] Appl. No.: 616,337

[22] Filed: Sept. 24, 1975

[51] Int. Cl.² .................................................. G06F 11/12
[52] U.S. Cl. ............................................ 340/146.1 AQ
[58] Field of Search ................. 340/146.1 AQ, 172.5

[56] References Cited

U.S. PATENT DOCUMENTS

| | | | |
|---|---|---|---|
| 2,956,124 | 10/1960 | Hagelbarger | 340/146.1 AQ |
| 3,227,999 | 1/1966 | Hagelbarger | 340/146.1 AQ |
| 3,469,236 | 9/1969 | Gallager | 340/146.1 AQ |
| 3,605,090 | 9/1971 | Burton | 340/146.1 AQ |
| 3,718,905 | 2/1973 | Tong | 340/146.1 AQ |
| 3,728,678 | 4/1973 | Tong | 340/146.1 AQ |
| 3,873,971 | 3/1975 | En | 340/146.1 AQ |
| 3,882,457 | 5/1975 | En | 340/146.1 AQ |

OTHER PUBLICATIONS

Peterson & Weldon, Error-Correcting Codes, Second Edition, The MIT Press, 1972, Cambridge, Mass., pp. 392-401 and 427-431.

Primary Examiner—Charles E. Atkinson
Attorney, Agent, or Firm—James W. Gillman; Victor Myer; James P. Hamley

[57] ABSTRACT

A rate one-half random error convolutional coding system corrects the theoretical limit of one error out of four successive bits. An information bit stream is processed through the system encoder which is comprised of a two-bit shift register and a modulo-2 adder. The encoder generates a parity bit formed by the modulo-2 summing of successive pairs of information bits, and produces a convolved transmission bit stream. The system decoder is the replica of the encoder in combination with a two-bit syndrome register, an AND gate, complementary feedback circuitry, and an output modulo-2 adder.

Overall system performance is the simplest, fastest, and highest performing of all such systems known to date.

16 Claims, 3 Drawing Figures

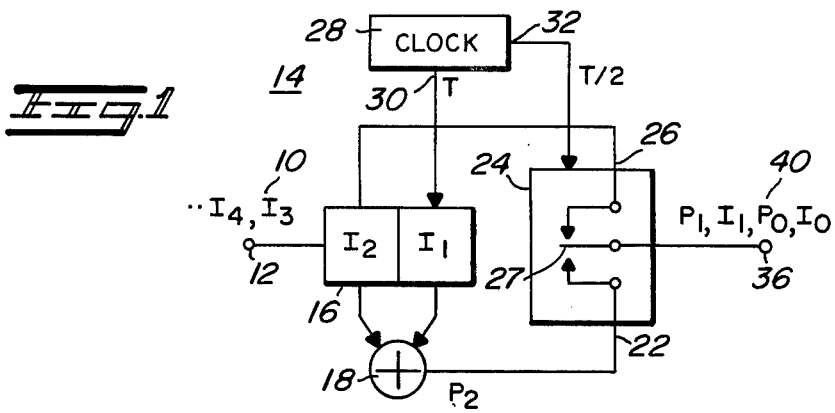
*Fig.1*
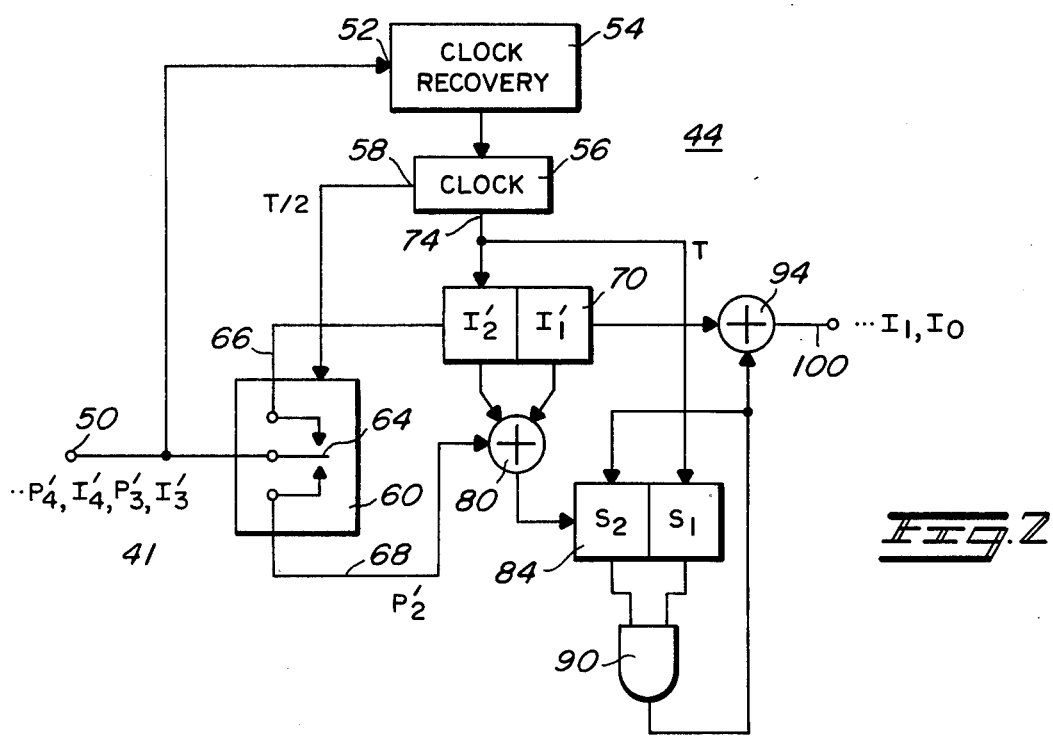
*Fig.2*
*Fig.3*
ENCODER EQUATIONS
$P_1 = I_0 \oplus I_1$
$P_2 = I_1 \oplus I_2$
IN GENERAL
$P_j = I_{j-1} \oplus I_j$
$P_{j+1} = I_j \oplus I_{j+1}$
WHERE $i, j = 1, 2, 3, \cdots$
DECODER EQUATIONS
$S_1 = P'_1 \oplus I'_0 \oplus I'_1$
$S_2 = P'_2 \oplus I'_1 \oplus I'_2$
IN GENERAL
$S_j = P'_j \oplus I'_{j-1} \oplus I'_j$
$S_{j+1} = P'_{j+1} \oplus I'_j \oplus I'_{j+1}$
WHERE $i, j = 1, 2, 3, \cdots$

ONE-ERROR CORRECTION CONVOLUTIONAL CODING SYSTEM

BACKGROUND OF THE INVENTION

This invention relates to error correction coding systems and, more particularly, to a rate one-half convolutional coding system capable of correcting one random error for each four successive bits in a bit stream.

Error correcting codes are well known in the art, especially in the digital computer and digital data communication fields. Errors may occur whenever a stream of digital information bits, i.e., a sequence of logic "0" or "1" levels, is transmitted over a channel subject to noise interference. It has been found that induced channel error can be detected and corrected if parity bits are transmitted along with the information bits. The parity bits are related to the information bits in a predetermined manner such that upon reception errors in transmission may be found. Parity bits may be sent in blocks, or they can be convolved with the information bits. The rate of an encoding system is defined as the ratio of the number of information bits to the total number of bits in a coded transmission. The present invention is addressed to convolutional codes having a rate of one-half, i.e., one parity bit for every information bit.

Many encoding schemes have been devised but, until my recent discovery, which is the subject of U.S. patent application Ser. No. 438,138, filed Jan. 30, 1974, now U.S. Pat. No. 3,882,457, and assigned to the same assignee as the instant invention, no code realized the theoretical maximum of correcting one error in each four successive transmitted bits. A drawback with the aforementioned encoding system is that, in some applications, it requires a minimum six bit delay for each message transmitted. Not only is the delay detrimental to swift communication, but it also requires more hardware.

SUMMARY OF THE INVENTION

It is an object of the present invention, therefore, to provide an improved random error correction system capable of correcting errors at the maximum theoretical limit.

More specifically, it is an object of this invention to provide an error correction system that can correct one random error out of every four bits transmitted with a minimum of time delay in transmission and a minimum number of components for system implementation. Briefly, according to the invention, information bits to be transmitted are received and stored in two successive stages of an information bit sample and storage register. Parity bits are generated by taking the modulo-2 sum of both information bit stages. A switch alternately transfers information and parity bits to the encoder output. The switch is driven from a clock which also controls the shifting of bits through successive stages of the information bit sample and storage register. In response to the clock, the switch applies one information bit and one parity bit to the encoder output between each shift of information in the information bit sample and storage register.

The system decoder receives the information bits and parity bits. The information bits are passed through a second information bit sample and storage register which also has two stages for storing two successively received information bits. A syndrome bit generator connects to the two stages of the second information bit sample and storage means, and to the parity bits from the transmission stream received input. A second modulo-2 adder, within the syndrome bit generating means, takes the modulo-2 sum of the stored information bits and a received parity bit whereby a corresponding syndrome bit is generated. The syndrome bits are passed through a two stage sample and storage register, each stage of which connects to a correction signal generator comprised of an AND gate. A correction signal generator output connects to one of two inputs of a modulo-2 adder, whose second input connects to the second stage of the information bit sample and storage register. In operation, if no error has occurred, the contents of the information bit sample and storage register are passed to the decoder output. However, should the stages of the syndrome register indicate that an information bit is in error, a correcting signal is applied to the output modulo-2 adder, whereby the subject information bit is corrected. By an appropriate feedback means, the correction signal also compensates for the corresponding error produced in the syndrome register by the incorrect information bit.

DESCRIPTION OF THE DRAWINGS

FIG. 1 is a block diagram of a preferred embodiment of the encoder portion of the error correcting system according to the invention;

FIG. 2 is a block diagram of the decoder used in combination with the encoder of FIG. 1 in the preferred error correcting system according to the invention; and FIG. 3 lists both encoding and decoding equations which mathematically illustrate encoder and decoder operation.

DESCRIPTION OF THE PREFERRED EMBODIMENTS OF THE INVENTION

The encoder, according to the invention, is best understood with reference to FIG. 1. There a stream of information bits 10 is shown being applied to the input terminal 12 of the encoder 14. Successive pairs of information bits are sampled and stored in the two stage information bit register 16. Information register 16 connects to input terminals of a modulo-2 adder 18. A modulo-2 adder produces at its output the modulo-2 sum of signals at its inputs. The truth table for modulo-2 addition is as follows:

$$0 \oplus 0 = 0$$

$$0 \oplus 1 = 1$$

$$1 \oplus 0 = 1$$

$$1 \oplus 1 = 0$$

The modulo-2 adder 18 generates a parity bit which is applied to one terminal 22 of output switch 24. The remaining switch terminal 26 connects to the first stage of the information bit register 16.

A clock 28 generates at its first output 30 a signal suitable for shifting information bits through the information bit register 16 at a rate having a period T. At its second output 32, the clock produces a signal suitable for switching the pole 27 of switch 24 at a rate whose period is one-half T. The switch pole 27 connects to the decoder output line 36.

Encoder 14 operation is better understood with reference to the encoder equations shown in FIG. 3. Information bits are sequentially stepped through the information bit register 16. The modulo-2 adder 18 produces a parity bit equal to the modulo-2 sum of the corresponding information bits. The clock 28 activates switch 24 to alternately couple information bits and their corresponding parity bits to the encoder output 36.

Prior to receiving the information bit stream 10, the information bit storage register is cleared to binary "0" levels in both stages. Thus when the first information bit $I_0$ is received, the register 16 contains $I_0$ and 0. The encoder produces at output line 36 $I_0$, and thereafter $P_0$ (the modulo-2 sum of $I_0$ and "0"). A period T later the clock activates register 16 whereby information $I_0$ is shifted to the second stage, and information bit $I_1$ is entered in the first stage. Bit $I_1$ is passed to the encoder output via switch 24, and thereafter the parity bit $P_1$, which is equal to the modulo-2 sum of $I_0$ and $I_1$.

This process continues until the entire information bit stream 10 has been encoded into a transmission stream 40. The transmission stream 40 has twice the number of bits as the information stream 10 since one parity bit is generated for each information bit. A generalized equation for determining the value of any parity bit in the transmission stream 40 is given in FIG. 3.

After being carried over a transmission channel, the received transmission bit stream 41 is applied to a decoder 44 shown in FIG. 2. The parity and information bits in received transmission stream 41 are indicated as primed since, due to transmission interference or noise, they may not be the same values as were encoded in stream 40 (FIG. 1). The received transmission stream 41 is applied to decoder input terminal 50. Connected to terminal 50 is the trigger input terminal 52 of a clock recovery circuit 54. This circuit activates a clock 56 whereby the clock period is synchronous to the period T of the input transmission stream 41.

A first clock output 58 activates a switch 60 at a rate whose period is one-half T. A pole 64 of switch 60 connects to decoder input terminal 50. Since switch 60 is activated by clock 56 at a rate whose period is equal to one-half that of the input transmission stream 41, the received information bits are passed to switch first output 66, and the parity bits are passed to switch second output 68.

Connected to the first switch output 66 is an information bit sample and storage register 70 which has two stages for storing successive pairs of the information bits. Information bits are shifted through register 70 at a rate T determined by the clock's second output 74.

A modulo-2 adder 80 connects to each of the two stages of the information register 70, and to the parity bits separated by switch 60 at switch second terminal 68. The modulo-2 summation of the three inputs to modulo-2 adder 80 produces syndrome bits which are sequentially applied to a syndrome two-stage register 84. Bits in syndrome register 84 are shifted at a rate whose period is T, which is also determined by the clock's second output 74.

Each input of a two input AND gate 90 connects to one of the stages of the syndrome register 84. AND gate 90 produces an output "0" signal whenever one of the syndrome register 84 stages is at a "0" level. Should both syndrome register 84 stages be at a "1" level, then AND gate 90 produces a correction signal having logic level "1" which is coupled both to the first stage of syndrome register 84, and to one input of a final modulo-2 adder 94 whose remaining input couples to the output stage of the information bit register 70. Due to the logic of the system, which is more fully discussed hereinbelow, when both syndrome stages assume a logic "1" level, the information bit in the final information register stage is considered to be in error. Thus the final modulo-2 adder 94 acts as a correcting circuit to pass unaltered all information bits which are correct, but to correct those bits which are detected as being in error.

Decoder 44 operation is best understood with reference to the decoder equations given in FIG. 3. The received transmission stream 41 is divided into information bits and parity bits through the action of clock recovery circuit 54, clock 56, and switch 60. Successive pairs of information bits are stored in information register 70. A modulo-2 adder 80 acts as a syndrome bit generator, by taking the modulo-2 addition of the syndrome register 70 along with a corresponding parity bit input from switch terminal 68. Thus, for example, syndrome bit $S_1$ is equal to the modulo-2 sum of the information bits $I_0'$, $I_1'$, and parity bit $P_1'$. Syndrome bit $S_2$ is equal to the sum of information bits $I_1'$, $I_2'$, and parity bit $P_2'$. And, in general, any syndrome bit can be found from the generalized decoder equations given in FIG. 3.

That the decoding process can detect and correct one out of four successive received transmission bits may be understood as follows. Assuming the decoder is in the state illustrated in FIG. 2, namely that information bits $I_1'$ and $I_2'$ are stored in the information register 70, then the values of $S_1$ and $S_2$ stored in syndrome register 84 are given in FIG. 3. Notice that if there are not transmission errors, i.e., if: $I_0$ equals $I_0'$; $I_1$ equals $I_1'$, $P_1$ equals $P_1'$, and $P_2$ equals $P_2'$, then both $S_1$ and $S_2$ are at logic level "0." This is so since, from the encoder equations, $P_1$ equals the modulo-2 sum of $I_0$ and $I_1$, and $P_2$ equals the modulo-2 sum of $I_1$ and $I_2$. Under these circumstances, the output of AND gate 90 would assume a logic "0" level and the stored value of $I_1'$ would be passed uncorrected through modulo-2 adder 94 to decoder output line 100.

Now assume that an error in transmission has occurred whereby $I_1 \neq I_1'$. Assuming all other bits were transmitted correctly, then both $S_1$ and $S_2$ equal a logic "1" level. AND gate 90 now produces a correcting signal of level "1" at its output which is coupled to the final modulo-2 adder 94, whereby information bit $I_1'$ is corrected prior to being passed to the decoder output line 100.

By observation, only the $I_1'$ term is common to the equations defining $S_1$ and $S_2$. Thus, assuming that only one of four successive bits in transmission stream 41 is an error, both $S_1$ and $S_2$ will equal one only when $I_1'$ is an error. If any one of the other factors, i.e., $I_2'$, $P_1'$, or $P_2'$, is incorrect, only $S_1$ or $S_2$ will assume a logic "1" level and, thus, AND gate 90 will produce an output "0" level.

In general, for any sequence of four successive transmission bits, $I_j'$, $P_j'$, $I_{j+1}'$, $P_{j+1}'$, both corresponding syndrome bits $S_j$ and $S_{j+1}$ will assume a logic "1" level only if $I_j' \neq I_j$. This assumes that the remaining three bits and the previous bit $I_{j-1}'$ are correct.

Finally, to correct an error in a syndrome bit which results from an error in an information bit, the correcting signal output from AND gate 90 connects to the first stage of the syndrome bit register 84 whereby when an erroneous information bit $I_j'$ is detected a correcting change is made to the corresponding syndrome bit.

In summary, a rate one-half convolutional coding system has been disclosed which is capable of operating at the theoretical maximum of correcting one random error per four successive transmitted bits. The system has a delay of only two bits per message thus assuring rapid communication as well as a minimum number of components in system fabrication.

While a preferred embodiment of the invention has been disclosed, it should be apparent that many modifications and variations thereto are possible, all of which fall within the true spirit and scope of the invention.

I claim:

1. An encoder for use in an error correction system capable of correcting one of four bits in a bit stream, the encoder comprising:
   information bit sample and storage means having only two stages for receiving and storing two successive information bits;
   parity bit generating means connected to said two stages of the information bit sample and storage means, the parity bit generating means including modulo-2 adder means for taking the modulo-2 sum of the information bits stored in said information bit sample and storage means to thereby generate a parity bit at an output thereof;
   switch means connected to the information bit sample and storage means and the output of the parity bit generating means for alternately transferring information and parity bits respectively therefrom to the encoder output; and
   clock means connected to the information bit sample and storage means for successively shifting the information bits between the successive stages of the information bit sample and storage means, the clock means being further connected to the switch means, the switch means being responsive to the clock means for applying one information bit and one parity bit to the encoder output between each shift of information in the information bit sample and storage means.

2. An encoder as recited in claim 1 wherein the switch means is connected to the first stage of the information bit sample and storage means and to the output of the parity bit generating means.

3. An encoder as recited in claim 1 wherein the information bit sample and storage means comprises a shift register.

4. The encoder as recited in claim 1 in combination with a decoder comprising:
   means for receiving the information bits and the parity bits;
   second information bit sample and storage means having only two stages for storing two received information bits, having an input coupled to the receiving means, and an output;
   syndrome bit generating means having inputs and an output, the inputs being connected to said two stages of the second information bit sample and storage means, and to the receiving means, the syndrome bit generating means including second modulo-2 adder means for taking the modulo-2 sum of the received information bits stored in the stages connected to the syndrome bit generating means and a received parity bit associated therewith to thereby generate a syndrome bit associated with the last mentioned stored information bits and the parity bit associated therewith at the output;
   syndrome bit sample and storage means having two stages for storing two syndrome bits, the syndrome bit sample and storage means having a first stage thereof coupled to the output of the second modulo-2 adder means and a last stage;
   correction signal generating means having inputs connected to the first and last of the stages of the syndrome bit sample and storage means, and an output, the correction signal generating means being responsive to the syndrome bits stored in the stages connected thereto for providing a correction signal at the output thereof only when both of the stored syndrome bits have the same predetermined value; and
   correcting means connected to the output of the second information bit sample and storage means and the output of the correction signal generating means for correcting information bits present at the output of the second information bit sample and storage means in response to the correction signal from the correction signal generating means.

5. The combination as recited in claim 4 further including second clock means connected to the second information bit sample and storage means and the syndrome bit sample and storage means for successively shifting the received information bits and the syndrome bits between successive stages of the second information bit sample and storage means and the syndrome bit sample and storage means, respectively.

6. The combination as recited in claim 4 wherein the information bit sample and storage means has exactly two stages.

7. The combination as recited in claim 4 wherein each of the second information bit sample and storage means and the syndrome bit sample and storage means includes a shift register.

8. The combination as recited in claim 4 wherein the correction signal generating means includes an AND gate.

9. The combination as recited in claim 4 wherein the correcting means includes a modulo-2 adder.

10. The combination as recited in claim 4 wherein the output of the correction signal generating means is further coupled to the first stage of the syndrome bit sample and storage means, the syndrome bit sample and storage means being responsive to the correction signal to change the value of the syndrome bit stored in the last mentioned stage.

11. In an error correcting system for correcting random errors in a bit stream having no more than every fourth successive bit in error, an encoder for generating parity bits from information bits applied thereto and convolving the bits at a rate one-half, the encoder comprising:
   information bit sample and storage means having only two stages for serially receiving and storing the information bits, the information bit sample and storage means having a first stage and a last stage;
   means connected to the first stage of the information bit sample and storage means for applying each information bit thereto for storage therein;
   clock means connected to the information bit sample and storage means for sequentially shifting each information bit from the first stage to the last stage thereof;
   modulo-2 adder means connected to the first and last stages of the information bit sample and storage means for producing the modulo-2 sum of the information bits stored therein to thereby generate a parity bit at its output in response to each pair of information bits stored in the first and last stages of the information bit sample and storage means; and switch means having first and second input terminals and an output terminal, the first input terminal being connected to the first stage of the information bit sample and storage means and the second terminal being connected to the output of the modulo-2 adder, the switch means being further coupled to the clock means and responsive thereto for alternately coupling the first stage of the information bit sample and storage means and the last stage of the modulo-2 adder to the output terminal.

12. In an error correcting system for correcting random errors in a parity encoded bit stream having no more than every fourth successive bit in error, a decoder for extracting and correcting information bits from the stream, the decoder comprising:

means for receiving the bit stream;

information bit sample and storage means having only two stages, the information bit sample and storage means having a first stage coupled to the receiving means for receiving the information bits and a last stage;

syndrome bit generating means having inputs and an output, the inputs being connected to the first and last stage of the information bit sample and storage means, and to the receiving means, the syndrome bit generating means including modulo-2 adder means for taking the modulo-2 sum of the received information bits stored in the stages connected to the syndrome bit generating means and a received parity bit associated therewith to thereby generate a syndrome bit in response to each received parity bit and the stored information bits associated therewith at the output;

syndrome bit sample and storage means having two stages, the syndrome bit sample and storage means having a first stage connected to the output of the syndrome bit generating means for receiving the syndrome bits, and a last stage;

correction signal generating means having inputs connected to the two stages of the syndrome bit sample and storage means, the correction signal generating means being responsive to the syndrome bits stored in the stages connected thereto for providing a correction signal at the output thereof only when both of the stored syndrome bits have the same predetermined value;

correcting means connected to the last stage of the information bit sample and storage means and the output of the correction signal generating means for correcting information bits received from the information bit sample and storage means in response to the correction signal from the correction signal generating means; and clock means connected to the information bit sample and storage means and the syndrome bit sample and storage means for sequentially shifting each of the information bits and the syndrome bits, respectively, through each of the respective sample and storage means from the respective first stage to the respective last stage thereof.

13. In an error correcting system as recited in claim 12 wherein each of the information bit sample and storage means and the syndrome bit sample and storage means includes a shift register.

14. In an error correcting system as recited in claim 13 wherein the correction signal generating means includes an AND gate.

15. In an error correcting system as recited in claim 14 wherein the correcting means includes a modulo-2 adder.

16. In an error correcting system as recited in claim 12 wherein the output of the correction signal generating means is further coupled to the first stage of the syndrome bit sample and storage means, the syndrome bit sample and storage means being responsive to the correction signal to change the value of the syndrome bit stored in the last mentioned stage.

* * * * *